3,348,952
ENHANCING FLAVOUR OF FOODS USING FLAVOURING ENZYME PRODUCED BY A MICROORGANISM OF THE GENUS TRAMETES
Shiro Hori and Hirao Shimazono, Tokyo, Japan, assignors to Takeda Chemical Industries, Ltd., Osaka, Japan
No Drawing. Filed May 6, 1964, Ser. No. 365,482
Claims priority, application Japan, May 8, 1963, 38/24,635
17 Claims. (Cl. 99—116)

This invention relates to a method for intensifying and supplementing the flavours of dairy products. More particularly, the invention relates to a method for improving the flavour of cheese or butter and for imparting supplemental cheese- or butter-like flavour to any other dairy product, which comprises treating in the process of preparing dairy product from animal milk a starting material with flavouring enzyme produced by microorganisms belonging to the genus Trametes.

Studies carried out by the present inventors have revealed that microorganisms belonging to the genus Trametes produce during their incubation enzyme capable of enhancing or improving the flavour of dairy product. The enzyme is called flavouring enzyme throughout the present specification.

According to the known method, cheese is prepared by the following procedure: Animal milk is sterilized and 1–2% starter is added to the milk to produce lactic acid, followed by the addition of rennet to obtain curd. After whey is removed, curd is smashed. Then, whey is completely removed by pressing, followed by heating to obtain green cheese. Thus prepared green cheese is subjected to ripening at 5–15° C. in a ripening room.

In this process ripening requires rather a long time, generally, about 4–6 months or, in some cases, about 2 years. On the other hand, according to the present invention, cheese-like flavour comes out by treating green cheese with flavouring enzyme for a short time. Also, if flavouring enzyme is added to unripened butter, the butter acquires intensified flavour.

The first object of this invention is to provide a method for improving or intensifying the flavour of dairy product. The second object is to provide a dairy product which has improved or intensified flavour. The third object of this invention is to provide a method to shorten the period of time for ripening in the preparation of cheese. These objects are realized by treating animal milk or its processed matter with flavouring enzyme produced by microorganisms of the genus Trametes.

In this invention flavouring enzyme produced by microorganisms of the genus Trametes is employed. Examples of microorganisms of the genus Trametes are shown as follows:

Trametes purpurea Cooke
Trametes kusanoana Imaz.
Tremetes malicola Berk. et Curt.
Trametes cinnabarina (Jacq.) Fr. (ATCC No. 14623)
Trametes sanguinea (L. ex Fr.) Lloyd (ATCC No. 14622)
Trametes suaveolens (L.) Fr.
Trametes albida (Fr.) Bourd. et Galz.
Trametes heteromorpha (Fr.) Lloyd
Trametes dickinsii Berk.
Trametes trogii Berk.
Trametes palisoti (Fr.) Imaz.
Trametes acuta (Berk.) Imaz.
Trametes serpens Fr.
Trametes sendaiensis Yas.
Trametes muelleri Berk.
Trametes hispida Bagl.
Trametes ljubarskyi Pilát
Trametes aneba (Berk.) Imaz.

Among these microorganisms, Trametes sanguinea (L. ex Fr.) Lloyd, for example, has been found to be especially fit for the purpose of this invention.

Respective microorganisms are sometimes called by two or more different names.

The description of microorganisms in this specification is based on the system shown in "Mycological Flora of Japan" by Seiya Ito, published by Yokendo, Tokyo, in 1959.

These microorganisms are incubated in a liquid or solid medium. In general, the use of a liquid medium is preferable for the preparation of flavouring enzyme on an industrial scale. In most cases, it may be preferable to subject microorganisms of the genus Trametes to submerged cultivation. Preferably, microorganisms of the genus Trametes are incubated in stationary culture, shaken culture, culture under aeration, etc.

The culture medium employed desirably contains carbon and nitrogen sources which are assimilable by the microorganisms of the genus Trametes. As the assimilable carbon sources, there may be, for example, be starch, dextrin, sucrose, lactose, maltose, glucose, blackstrap molasses, glycerol, etc. As assimilable nitrogen sources, inorganic or organic compounds e.g. ammonium salts, various kinds of nitrates, cornsteep liquor, peptone, polypeptone, meat extract, soybean cake, soybean flour, wheat flour, yeast extract, urea, various kinds of amino acids may be used. In addition to the foregoing, minerals such as calcium salts, magnesium salts, potassium salts, sodium salts, zinc salts, copper salts, iron salts, vitamins, growth factors are desirably used for the culture medium as accessory nutrients.

Conditions of incubation should be controlled so as to produce the maximum amount of flavouring enzyme. Such conditions as pH of the medium, incubation temperature, incubation period, may vary with the kind of microorganisms, components of medium, concentration of components of medium, etc. In most cases, the incubation is desirably carried out at a temperature of about 25–35° C. and the accumulated flavouring enzyme in the culture broth reaches a maximum usually between several tens of hours and several hundred hours. The pH of the medium is adjusted to around 3.0–6.0.

Thus accumulated flavouring enzyme can be recovered from the culture broth. Generally-known means forrecov covering enzyme from a solution thereof can be applied to the recovery of the flavouring enzyme according to the present invention. The flavouring enzyme can be adsorbed onto an adsorbent or can be precipitated with a precipitant. Moreover, general means for recovery, such as precipitation near the isoelectric point, salting out, dialysis, and a combination of these may be carried out for the purpose of recovery and purification. Generally, the flavouring enzyme is contained in the culture filtrate. Accordingly, it may be preferable to recover the flavouring enzyme from the culture filtrate separated from the culture broth by means of filtration, centrifugation, etc. For example, the culture filtrate containing flavouring enzyme is subjected to salting out by the addition of an inorganic salt such as sodium sulfate ammonium sulfate, or by the addition of an appropriate hydrophilic organic solvent such as methanol, ethanol, noraml propanol, acetone, etc. The amount of these salts or hydrophilic organic solvent to be added may vary depending on the kind of salts or hydrophilic organic solvent. For example, ammonium sulfate may preferably be added to the culture filtrate up to 70% saturation. In case of employing hydrophilic organic solvent, 70% saturation may be preferable. If desired, thus obtained crude enzyme may be subjected to purification. It may preferably be carried out by repeatedly salting out with ammonium sulfate and the like. When ammonium sulfate is employed, a flavouring enzyme fraction may, in general, be obtained at 10–50% saturation.

Or, in this invention, materials containing flavouring enzyme e.g. culture broth, culture filtrate, cell bodies or mycelia, etc. may be employed as such, without recovering flavouring enzyme.

Microorganisms belonging to the genus Trametes may be incubated directly in animal milk or its processed matter. In this case, incubation may sufficiently be carried out without any addition of nutrients, as animal milk or its processed matter contains nutrients which are necessary for the growth of microorganisms. However, if desired, nutrients may be added. Cheese-like flavour can be brought about with the progress of incubation by the action of flavouring enzyme produced.

Thus obtained flavouring enzyme or material containing flavouring enzyme is allowed to act on the starting material of this invention.

As the starting material, there may be employed animal milk and its processed matter. As the animal milk, there may, for example, be cow's milk, goat's milk, etc. As the processed matter of animal milk, there may, for example, be skim milk, cream, butter, condensed milk, green cheese sour milk beverage, etc.

The procedure of the treatment may vary depending on conditions such as the kind or state of the starting material, etc. However, in general, the procedure may sufficiently be carried out by only mixing flavouring enzyme with the starting material, preferably under agitation. Temperature at the treatment, time required for the treatment, the amount of flavouring enzyme, etc. may vary with the kind of the starting material, etc.

More concretely stated, when green cheese is treated with flavouring enzyme, it may be preferable to agitate a mixture of green cheese and flavouring enzyme at about 10–20° C. By this treatment strong cheese-like flavour can be brought about in a short time. When flavouring enzyme is caused to act on animal milk or condensed milk, it may be preferable to adjust pH of the milk to the range of from acid to slightly alkali, desirably to pH 2–6, and then to agitate at about 20–40° C. for 1–3 hours. In this case 0.1–1.5% by weight of flavouring enzyme fraction may be sufficient for the treatment. Flavouring enzyme has an ability of coagulating milk as well as an effect of flavour enchancement on milk. Therefore, flavouring enzyme may serve as rennet, or when the pH is lowered with a suitable acid. e.g. lactic acid, it may serve as rennet and starter.

Flavouring enzyme according to this invention is applicable to the preparation of butter to bring about intensified or improved flavour. In hitherto known methods for preparing unripened butter, sterilized cream is first churned to make fat globule aggregate, then sodium chloride, a colouring agent, etc. are added thereto, if necessary. Ripening butter has been prepared by the addition of about 5% starter to sterilized cream and treating in the same way as in preparing unripened butter.

Treatment of unripened butter with flavouring enzyme gives it ripening butter-like flavour. The treatment may preferably be carried out at about 15–25° C. for 1–10 hours. Generally, 0.1–1.5% by weight of flavouring enzyme fraction may be sufficient for the treatment.

Flavouring enzyme may be employable in place of starter for the preparation of ripening butter. To describe the procedure more particularly, 0.1–1.5% of flavouring enzyme fraction is added to cream the pH of which is beforehand adjusted to form slightly alkaline to acid range with lactic acid, etc. The mixture is agitated at about 15–40° C. for 1–5 hours, whereupon pleasing flavour begins to come out. Then the resultant mixture is subjected to churning in accordance with a conventional method to obtain butter which has a pleasing flavour. If necessary, sodium chloride, colouring agent, etc. may be added.

Further, flavouring enzyme may be utilized in sour milk beverage such as yoghurt to intensify or improve the flavour thereof. Also, flavouring enzyme may be used in the preparation of sour milk beverage as starter in place of *Lactobacillus bulgaricus, Streptococcus thermophilus, Streptococcus lactis, Streptococcus cremoris*, etc., hitherto employed.

Flavouring enzyme may be applicable to any other kind of processed product of animal milk to obtain the same or similar result as mentioned above.

As a clear from the foregoing explanation, pleasingly flavoured dairy products are prepared by adding flavouring enzyme or material containing flavouring enzyme to a starting material or by incubating microorganisms of the genus Trametes in a starting material directly. In the process of the latter, the starting material which is beforehand adjusted to slightly alkaline to acid range, desirably at a pH of 2–6, is inoculated with microorganisms of the genus Trametes, with or without the addition of nutrients, e.g. nitrogen sources such as ammonium salts, meat extract, carbon sources such as sucrose, glucose, blackstrap molasses, growth factor, etc. In an industrial scale, the incubation may preferably be carried out in an aqueous culture medium under aeration and/or shaking, etc. In general, incubation at about 25–35° C. for several ten to several hundred hours gives pleasing flavour.

If desired, dairy products of this invention may be heated so as to prevent denaturation possibly occurring with the lapse of time.

Thus obtained dairy products of this invention can be utilized as foodstuff as it is, or after being processed with or without mixing with other foodstuffs.

The following examples are illustrative only and are not meant to limit the scope of this invention. In the examples percent means weight percent unless otherwise noted.

Example 1

*Trametes sanguinea* (L. ex Fr.) Lloyd (ATCC–14622) is inoculated to a sterilized aqueous medium of pH 6.0 containing 4% of sucrose, 2% of glucose, 3% of soybean cake, 1% of cornsteep liquor, 0.2% of ammonium sulfate, 0.2% of potassium dihydrogenphosphate, 0.1% of magnesium sulfate (7 hydrate) and 0.05% of copper sulfate. The medium is agitated with 160 rounds per minute under the aeration of 500 liters per minute. The incubation is carried out for 140 hours at 28° C. After adjusted to pH 4.0 with ammonium sulfate, the culture broth is filtered. Then, 200 kilograms of ammonium sulfate is added to thus obtain 400 liters of filtrate to yield precipitates. The precipitates are collected by centrifugation, and dried at 35° C. to give 4 kilograms of crude flavouring enzyme. 15 grams of thus obtained crude enzyme is dissolved in 150 milliliters of distilled water to be dialyzed at 4° C. for 1 day. The whole volume of the so dialyzed solution is made up to 220 milliliters and is then salted out with ammonium sulfate at 10%–58% saturation. Thus obtained flavouring enzyme is added to about 200 times of its weight of whole milk which is adjusted to pH 3.7 with lactic acid, and the mixture is agitated at 28° C. for 2 hours. By employing the resultant mixture, cheese is prepared by means of a conventional method, whereupon cheese having a pleasing flavour can be obtained without being subjected to ripening.

Employment of skim milk in place of whole milk gives also cheese having a pleasing flavour without being subjected to ripening, though the flavour is weaker to some extent than that of whole milk.

Example 2

To green cheese prepared by a conventional method is added flavouring enzyme obtained in the same way as in Example 1, and the mixture is agitated at 15° C. After 2 hours, a pleasing cheese-like flavour is achieved.

Example 3

Sterilized cow's milk is adjusted to pH 3 with lactic acid, to which is inoculated *Trametes sanguinea* (L. ex Fr.) Lloyd (ATCC-14622). The incubation is carried out by agitating 150 rounds per minute at 30° C. After about 110 hours, a pleasing flavour begins to be noticeable. Continuous incubation gives a pleasing strong flavour to the milk.

*Example 4*

Flavouring enzyme obtained in the same manner as in Example 1 is added to 200 times of its weight of sterilized cream having 35% of fat, after the cream has been adjusted to an acid pH with lactic acid, then the mixture is stirred at 37° C. for 4 hours. The resultant mixture is subjected to a conventional method for the preparation of butter to obtain butter having an excellent flavour.

The strains of *Trametes sanguinea* (L. ex Fr.) Lloyd employed in these examples have been maintained in American Type Culture Collection (ATCC), Washington, D.C., U.S.A.; bearing the accession number hereinbefore indicated.

Having thus disclosed this invention, what is claimed is:

1. In a process for the manufacture of a dairy product wherein an initial dairy material selected from the group consisting of milk and milk products is converted to the said dairy product, the improvement according to which the conversion is effected in the presence, in the material being converted, of flavouring enzyme produced by a microorganism of the genus Trametes.

2. The improvement according to claim 1, wherein the flavouring enzyme is added to the said initial dairy material.

3. The improvement according to claim 1, wherein the flavouring enzyme is produced in situ in said initial dairy material by incubating said microorganism therein.

4. The improvement according to claim 1, wherein the microorganism is *Trametes sanguinea* (L. ex Fr.) Lloyd.

5. The improvement according to claim 4, wherein the initial dairy material is a member selected from the group consisting of cow's milk, skim milk, cream, butter, condensed milk, green cheese and sour milk beverage.

6. The improvement according to claim 4, wherein the flavouring enzyme is mixed with the initial dairy product.

7. In the method of converting green cheese to cheese having the flavour of ripened cheese, the improvement according to which the conversion is effected in the presence in the green cheese of flavouring enzyme produced by a microorganism of the genus Trametes, whereby the said flavour is achieved without subjecting the product to ripening.

8. In the method of converting an initial dairy material selected from the group consisting of animal milk, skim milk and condensed milk to cheese having the flavour of ripened cheese, the improvement according to which the conversion is effected, in the total absence of rennet and starter, in the presence in the initial dairy material of flavouring enzyme produced by a microorganism of the genus Trametes, whereby the said flavour is achieved without subjecting the product to ripening.

9. A method for preparing butter with enhanced flavour, which comprises treating unripened butter with flavouring enzyme produced by a microorganism of the genus Trametes.

10. In a method for the production of butter from cream, the improvement according to which the conversion from cream to butter is effected, in the total absence of starter, in the presence in the cream of flavouring enzyme produced by a microorganism of the genus Trametes.

11. In a method for the production of sour milk beverage from animal milk, the improvement according to which the conversion from milk to sour milk is effected, in the total absence of starter, in the presence in the animal milk of flavouring enzyme produced by a microorganism of the genus Trametes.

12. Cheese having incorporated therein a flavour enhancing amount of a flavouring enzyme produced by a microorganism of the genus Trametes.

13. Butter having incorporated therein a flavour enhancing amount of a flavouring enzyme produced by a microorganism of the genus Trametes.

14. Sour milk beverage having incorporated therein a flavour enhancing amount of a flavouring enzyme produced by a microorganism of the genus Trametes.

15. Cheese as defined in claim 12 wherein the microorganism is *Trametes sanguinea* (L. ex Fr.) Lloyd.

16. Butter as defined in claim 13 wherein the microorganism is *Trametes sanguinea* (L. ex Fr.) Lloyd.

17. Sour milk beverage as defined in claim 14 wherein the microorganism is *Trametes sanguinea* (L. ex Fr.) Lloyd.

References Cited

Katsumi, T., et al., Acid Protease Produced by *Trametes sanguinea*, a Wood-Destroying Fungus. Agricultural and Biological Chemistry. Published by the Agricultural Chemical Society of Japan. Vol. 28, 1964 (pages 770–778) (copy in Group 172).

A. LOUIS MONACELL, *Primary Examiner.*

D. M. NAFF, *Assistant Examiner.*